United States Patent [19]

Araki

[11] Patent Number: 4,627,884

[45] Date of Patent: Dec. 9, 1986

[54] METHOD OF AND APPARATUS FOR APPLYING LOOPED RUBBER MEMBER ONTO TIRE BUILDING DRUM

[75] Inventor: Yusuke Araki, Kodaira, Japan

[73] Assignee: Bridgestone Corporation, Tokyo, Japan

[21] Appl. No.: 708,814

[22] Filed: Mar. 5, 1985

[30] Foreign Application Priority Data

Mar. 15, 1984 [JP] Japan .................................. 59-49926

[51] Int. Cl.⁴ ............................................. B29D 30/32
[52] U.S. Cl. ..................................... 156/131; 156/403; 156/406.2; 156/126
[58] Field of Search ............ 156/126, 131, 133, 406.2, 156/407, 394.1, 406.6, 414, 417–420, 421.8, 403; 425/38

[56] References Cited

U.S. PATENT DOCUMENTS 2,936,813 5/1960 Haase .................................. 156/126
3,909,336 9/1975 Takahashi et al. ............... 156/406.2
4,039,365 8/1977 Takasuga et al. ................. 156/405.1

FOREIGN PATENT DOCUMENTS 1181901 11/1964 Fed. Rep. of Germany ...... 156/126
1237300 3/1967 Fed. Rep. of Germany ...... 156/126
2609657 9/1977 Fed. Rep. of Germany ...... 156/126

Primary Examiner—Lois E. Boland
Attorney, Agent, or Firm—Cushman, Darby & Cushman

[57] ABSTRACT

A method of applying a looped rubber member on a tire building drum having grooves formed in the periphery thereof, comprising the steps of inserting at least two pairs of retaining members into the looped rubber member in a first direction; retaining the looped rubber member on the retaining members; rotating the retaining members with the looped rubber member retained thereon toward the tire building drum to a second direction which is opposite to the first direction; forming the looped rubber member on the retaining members into a substantially circular configuration; transferring the substantially circular looped rubber member toward the tire building drum into a first position in which the center of the looped rubber member is in axial alignment with the longitudinal center axis of the tire building drum; further transferring the substantially circular looped rubber member from the first position into a second position in which the looped rubber member surrounds the periphery of the tire building drum radially contracted; receiving the retaining members in the grooves in the periphery of the tire building drum; applying the substantially circular looped rubber member on the periphery of collapsible tire building drum; and withdrawing the retaining members from the grooves in the periphery of the tire building drum.

13 Claims, 8 Drawing Figures

METHOD OF AND APPARATUS FOR APPLYING LOOPED RUBBER MEMBER ONTO TIRE BUILDING DRUM

FIELD OF THE INVENTION

The present invention relates to a method of and an apparatus for applying a looped rubber member onto a collapsible tire building drum, and more particularly a method of and an apparatus for transferring automatically the looped member from a looped member forming machine to a collapsible tire building drum on which tires are built and applying automatically the transferred looped member onto the collapsible collapsible tire building drum.

SUMMARY OF THE INVENTION

In accordance with one important aspect of the present invention, there is provided a method of applying a looped rubber member from a looped rubber forming machine onto a collapsible tire building drum having grooves formed in the periphery thereof, comprising the steps of (1) inserting at least two pairs of retaining members into the looped rubber member depending from the looped rubber forming machine in a first direction; (2) retaining the looped rubber member on the retaining members from the looped rubber forming machine; (3) rotating the retaining members with the looped rubber member retained thereon toward the collapsible tire building drum to a second direction which is opposite to the first direction; (4) forming the looped rubber member on the retaining members into a substantially circular configuration; (5) transferring the substantially circular looped rubber member toward the collapsible tire building drum into a first position in which the center of the looped rubber member is in axial alignment with the longitudinal center axis of the collapsible tire building drum; (6) further transferring the substantially circular looped rubber member from the first position into a second position in which the looped rubber member surrounds the periphery of the collapsible tire building drum radially contracted; (7) receiving the retaining members in the grooves in the periphery of the collapsible tire building drum; (8) applying the substantially circular looped rubber member onto the periphery of the collapsible tire building drum; and (9) withdrawing the retaining members from the grooves in the periphery of the collapsible tire building drum.

In accordance with another important aspect of the present invention, there is provided an apparatus for applying a looped rubber member from a looped rubber forming machine onto a collapsible tire building drum having grooves formed in the periphery thereof, comprising at least two pairs of retaining members for retaining the looped rubber member thereon from the looped member forming machine; retaining member driving means having the retaining members mounted thereon and adapted for driving one pair of the retaining members of the two pairs to move toward and away from each other and the other pair of the retaining members to move angularly with respect to the one pair of the retaining members; support member for supporting the retaining member driving means thereon; support member rotating means mounted on the support member and adapted for rotating the support member about the center of the support member; carrier plate having the support member rotatably mounted thereon; carrier plate driving means having the carrier plate mounted thereon and adapted for driving the carrier plate to move vertically toward and away from the collapsible tire building drum; slide block having the carrier plate driving means mounted thereon; and slide block driving means having the slide block threadably mounted thereon and adapted for driving the slide block to move horizontally toward and away from the tire building machine.

DESCRIPTION OF THE PRIOR ART

Conventionally, apparatuses for taking up looped rubber members from a looped member forming machine by which the looped rubber members are manufactured have been known in Japanese publication Nos. 52-44792 and 52-44793, both of which form the basis of U.S. Pat. No. 4,039,365, issued Aug. 2, 1977. The looped rubber member retained in such taking-up apparatuses, however, can not be automatically transferred and applied onto a collapsible tire building drum on which the tires are built, and accordingly is applied on the collapsible tire building drum through an apparatus adapted for transferring the looped rubber member to the collapsible tire building drum or by operators. In the apparatuses taught in the Japanese publication Nos. 52-44792 and 52-44793, thus, the apparatus adapted for transferring the looped rubber member is further necessarily required between the taking-up apparatus and the collapsible tire building drum in order to apply the looped rubber member on the collapsible tire building drum. An apparatus has then been designed for applying the looped rubber member from the looped member forming machine onto the collapsible tire building drum. The apparatus comprises retaining means such as suction cups by means of which the looped rubber member is retained circumferentially at the outer surface thereof from the outside of the looped rubber member. This apparatus, however, is necessarily made as a large-sized construction since the looped member is retained at the outer surface thereof from the outside of the looped rubber member. Furthermore, there is another drawback in that the looped rubber member may be detached from the suction cups by the reason that the looped rubber member is attached to the suction cups by suction.

It is accordingly one important of the present invention to provide a method of and an apparatus for applying automatically the looped rubber member from the looped member forming machine onto the collapsible tire building drum with the looped rubber member retained on the retaining members from the inside of the looped member.

It is another important of the present invention is to provide an apparatus of a small size for applying automatically the looped rubber member from the looped member forming machine on the collapsible tire building drum.

BRIEF DESCRIPTION OF THE DRAWING

The features and advantages of the method of and the apparatus for applying automatically the looped rubber member from the looped member forming machine on the collapsible tire building drum in accordance with the present invention will be more clearly appreciated from the following description taken in conjunction with the accompanying drawings in which.

DESCRIPTION OF THE PREFERRED EMBODIMENT

Figure 1:
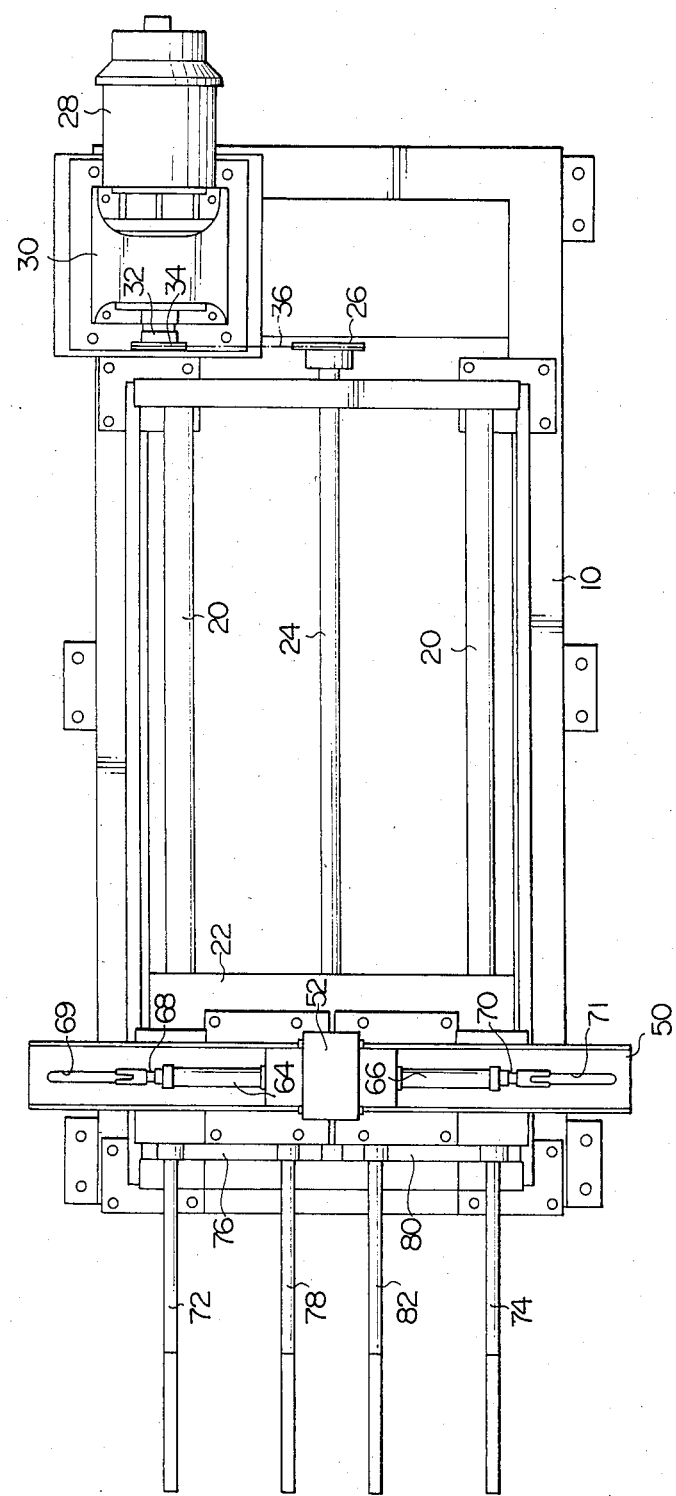
FIG. 1 is a plan view showing the overall arrangement and construction of the apparatus in accordance with the present invention.
Figure 2:
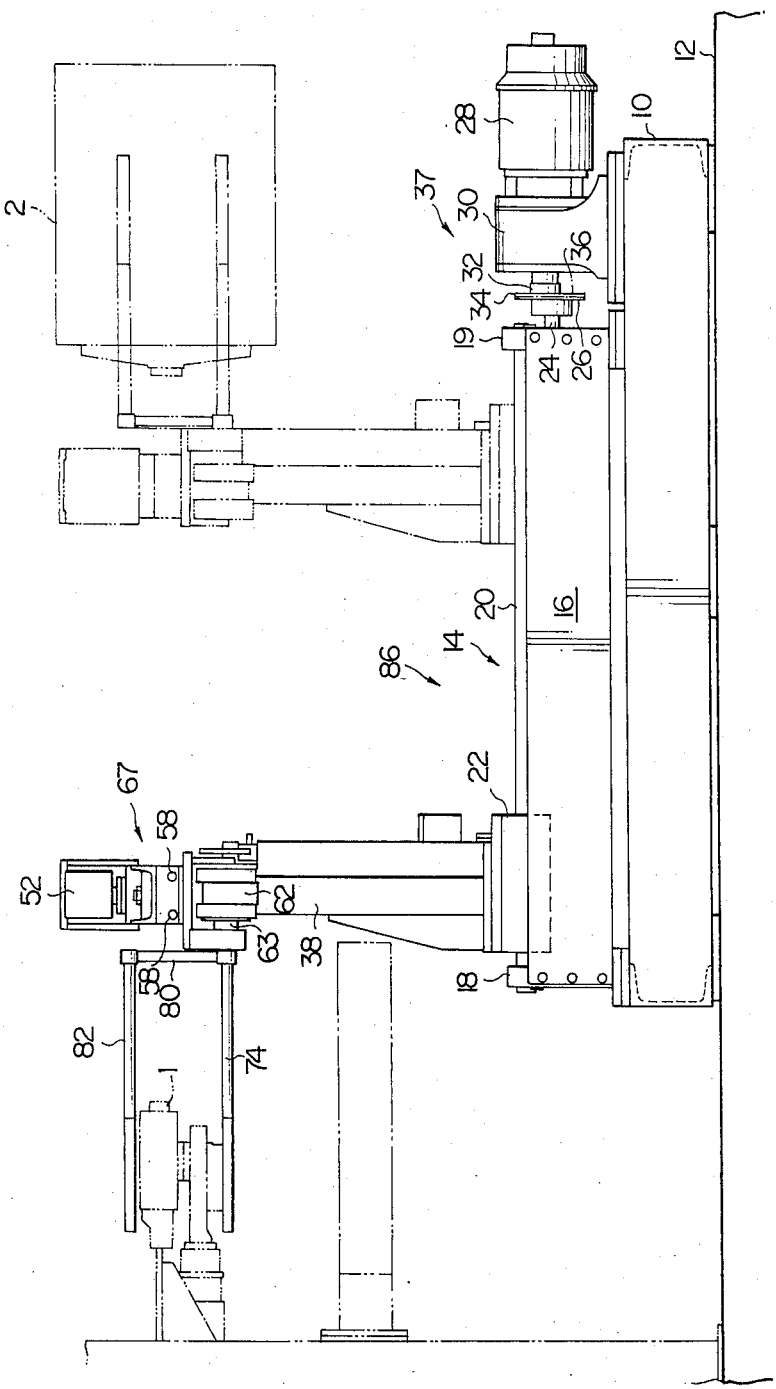
FIG. 2 is a side view showing the apparatus of the present invention held in an axial alignment with the looped member forming machine indicated by phantom lines and the collapsible tire building drum indicated by phantom lines on which the looped rubber member manufactured by the forming machine is to be applied through the method and the apparatus in accordance with the present invention.
Figure 3:
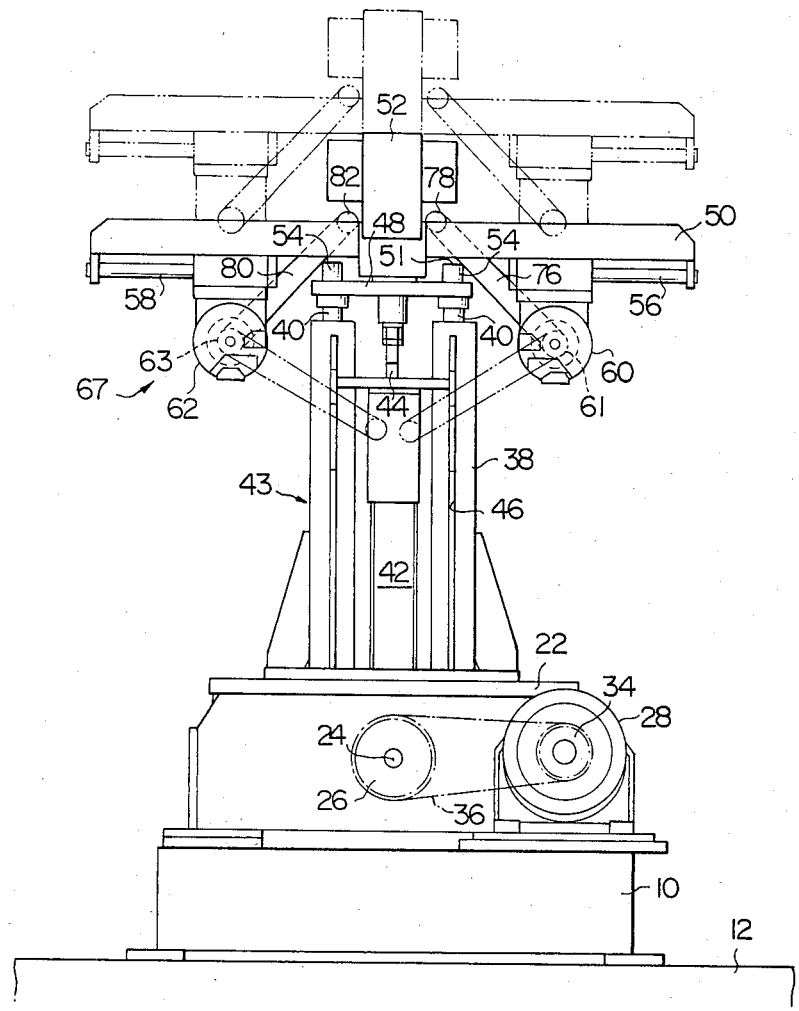
FIG. 3 is an end view showing the apparatus in accordance with the present invention.
Figure 6:
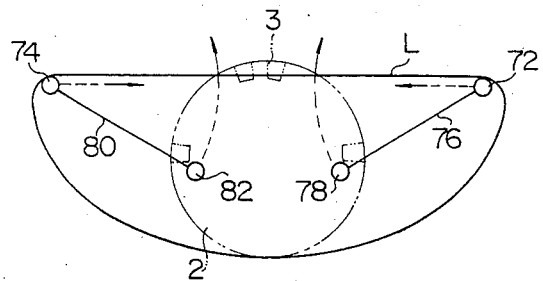
FIG. 6 is a view showing paths of the retaining members through which the looped rubber member shown in FIG. 5 is to be formed into a substantially circular configuration.

Referring now to the drawings and more particularly FIGS. 1, 2 and 3, there is shown a preferred embodiment of the looped member applying apparatus in accordance with the present invention in which a looped rubber member is automatically applied from a looped member forming machine 1 (as indicated by phantom lines in FIG. 2) onto a collapsible tire building drum 2 (as indicated by phantom lines in FIG. 2) of a tire building machine on which tires are built. The looped member forming machine 1 is axially aligned with the collapsible tire building drum 2 which is radially movable with respect to the longitudinal center axis of the collapsible tire building drum 2. The collapsible tire building drum 2 has formed on the periphery thereof four grooves 3 (FIGS. 6, 7 and 8) for receiving therein four horizontal extending rods 72, 74, 78 and 82 which will be described hereinafter as the description will proceed. Each of the grooves 3 extends parallel to the longitudinal axis of the collapsible tire building drum 2. The looped rubber member L manufactured by the looped member forming machine 1 is placed on a holding plate 1a (FIG. 4) of the looped member forming machine 1.

A longitudinal extending base plate designated by reference numeral 10 is mounted on a floor 12 such that the looped member forming machine 1 is arranged in axial alignment with the collapsible tire building drum 2. The base plate 10 in turn has fixedly mounted thereon a longitudinal frame structure 14 consisting of a pair of upstanding side plates 16 and a pair of upstanding front end plate 18 and rear end plate 19. In the upper portions of the end plates 18 and 19 are fixedly received longitudinal extending guide rails 20 each of which extends in parallel relationship to the longitudinal axes of the looped member forming machine 1 and the collapsible tire building drum 2. The parallel guide rails 20 have slidably mounted thereon a slide block 22 which is threadably mounted on the threaded portions of a threaded drive shaft 24 which extends parallel to and within the parallel guide rails 20. The threaded drive shaft 24 is rotatably received at the front end portion thereof in the front end plate 18 of the frame structure 14 and at the rear end portion thereof in the rear end plate 19 of the frame structure 14. The rear end portion of the threaded drive shaft 24 protrudes from the rear end plate 19 and carries a driven sprocket gear 26 thereon. A chain drive unit such as a reversible motor 28 is also mounted on the base plate 10 and connected through the output shaft thereof to a gear reducer 30. The gear reducer 30 has an output shaft 32 carrying thereon a drive sprocket gear 34 which is drivably connected through an endless chain 36 to the driven sprocket gear 26 carried on the threaded drive shaft 24. Thus, as the reversible motor 28 is operated, the chain 36 is driven in directions to rotate the threaded drive shaft 24 clockwise or anticlockwise so that the slide block 22 threadably mounted on the threaded drive shaft 24 moves on and along the parallel guide rails 20 toward and away from the looped member forming machine 1 or the collapsible tire building drum 2. A pair of vertical guide posts designated by reference numeral 38 upstand from the slide block 22 and each of the vertical guide posts 38 has a vertical guide rod 40 slidably received in a vertical bore formed therein. Between the vertical guide posts 38 upstands a vertical air cylinder 42 which has a piston rod 44 vertically projecting from and retracting into the cylinder body of the vertical air cylinder 42. The piston rod 44 is movable vertically upwardly and downwardly with respect to the longitudinal axes of the looped member forming machine 1 and the collapsible tire building drum 2 by means of a bracket of the piston rod 44 slidably received in vertical slots 46 respectively formed in the vertical guide posts 38. A carrier plate designated by reference numeral 48 is mounted on the leading ends of the guide rods 40 and the piston rod 44 of the vertical air cylinder 42. Thus, the carrier plate 48 is movable vertically upwardly and downwardly through the vertical slots 46 in the vertical guide posts 38 in response to upward and downward movements of the piston rod 44 of the vertical air cylinder 42. On the carrier plate 48 is rotatably mounted a horizontal extending support member 50 which rotates coaxially about the center axis of the vertical air cylinder 42. The horizontal support member 50 is driven to rotate about the center thereof by means of support member rotating means such as a rotary actuator 52 and has mounted on the underside thereof a projection 51 which is brought into abutment with one of two stops 54 on the carrier plate 48 when the horizontal support member 50 is rotated through 180 degrees from an initial position thereof. Thus, the rotational range of the horizontal support member 50 is regulated to 180 degrees by means of the stops 54 which are angularly spaced 180 degrees away from each other on the carrier plate 48 with respect to the center of the carrier plate 48. On the undersides of the opposite end portions of the horizontal support member 50 are mounted a pair of first guide rods 56 and of second guide rods 58. The first guide rods 56 extend horizontally in parallel relationship to the horizontal support member 50 and have a first rotary actuator 60 slidably mounted thereon. Similarly, the guide rods 58 extend horizontally in parallel relationship to the horizontal support member 50 and have slidably mounted a second rotary actuator 62 thereon. A pair of first and second horizontal air cylinders respectively designated by reference numerals 64 and 66 are oppositely disposed on the horizontal support member 50 and synchronized with each other. The first horizontal air cylinder 64 has a piston rod 68 which is connected through a longitudinal slot 69 in the horizontal support member 50 to the first rotary actuator 60 slidably mounted on the first guide rods 56, while the second air cylinder 66 has a piston rod 70 which is connected through a longitudinal slot 71 in the horizontal support member 50 to the second rotary actuator 62 slidably mounted on the second guide rods 58. Thus, as the horizontal air cylinders 64 and 66 oppositely mounted on the horizontal support member 50 are operated, the piston rods 68 and 70 are simultaneously driven to move along the slots 69 and 70, respectively, so that the rotary actuators 60 and 62 move symmetrically on and along the guide rods 56 and 58 toward and away from each other. A first retaining member such as a first horizontal extending rod designated by reference numeral 72 is mounted coaxially on an output shaft 61 of the first rotary actuator 60 and rotatable about the center axis thereof in response to rotation of the output shaft 61. Likewise, a second retaining member such as a second horizontal extending rod designated by reference numeral 74 is mounted coaxially on an output shaft 63 of the second rotary actuator 62 and rotatable about the center axis thereof in response to rotation of the output shaft 63. The first and second horizontal extending rods 72 and 74 are substantially equal in length to each other and horizontally extend substantially parallel to each other. On the first horizontal extending rod 72 are mounted a first connecting arm 76 which connects the first horizontal extending rod 72 with a third horizontal extending rod 78. The third horizontal extending rod 78 is substantially equal in length and extends parallel to the first horizontal extending rod 72. Likewise, on the second horizontal extending rod 74 are mounted a second connecting arm 80 which connects the second horizontal extending rod 74 with a fourth horizontal extending rod 82. The fourth horizontal extending rod 82 is substantially equal in length and extends parallel to the second extending rod 74. The first and second connecting arms 76 and 80 are substantially equal in length to each other. The first and second rotary actuators 60 and 62 are simultaneously rotated about their axes in opposite directions with each other. Thus, as the first and second rotary actuators 60 and 62 are operated, the connecting arms 76 and 80 are angularly moved symmetrically with each other, in response to rotations of the first and second horizontal extending rods 72 and 74, and accordingly the horizontal rods 78 and 82 are angularly moved symmetrically with each other with respect to the first and second horizontal extending rods 72 and 74. The above-noted guide rods 56 and 58, rotary actuators 60 and 62, and air cylinders 64 and 66 as a whole constitute retaining member driving means 67 adapted for driving the first and second retaining members 72 and 74 to move toward and away from each other and the third and fourth retaining members 78 and 82 to move angularly with respect to the first and second retaining members 72 and 74. The above-noted parallel guide rails 20, slide block 22, threaded drive shaft 24, sprocket gears 26 and 34, reversible motor 28, gear reducer 30, endless chain 36 as a whole constitute slide block driving means 37 adapted for driving the slide block 22 to move horizontally toward and away from the looped member forming machine 1 or the collapsible tire building drum 2. The above-noted guide posts 38, guide rods 40 and air cylinder 42 as a whole constitute carrier member driving means 43 adapted for driving the carrier member 51 to move vertically toward and away from the looped member forming machine 1 or the collapsible tire building drum 2.

Operation of the looped member applying apparatus thus constructed and arranged will be now described in detail hereinafter.

Figure 4:
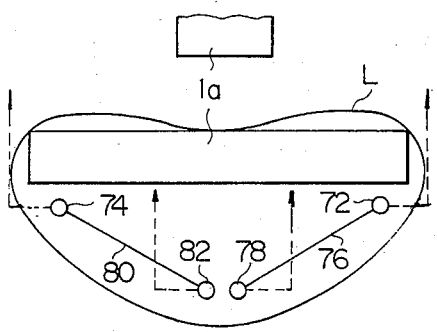
FIG. 4 is a view showing the looped rubber member depending from a holding plate of the looped member forming machine with retaining members of the present invention inserted into the looped rubber member, and paths of the retaining members through which the looped rubber member is to be retained on the retaining members.
Figure 5:
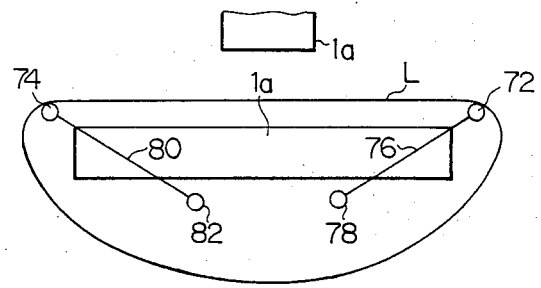
FIG. 5 is a view similar to FIG. 4 but shows the looped rubber member retained on the retaining members through the paths of the retaining members shown in FIG. 4.
Figure 7:
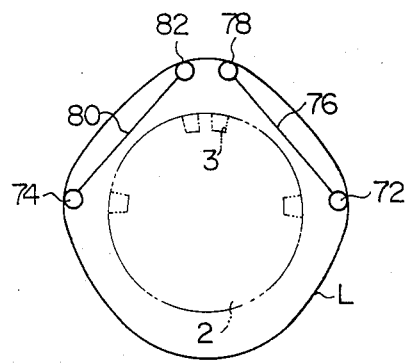
FIG. 7 is a view showing the looped rubber member formed into a substantially circular configuration through the paths of the retaining members shown in FIG. 6.
Figure 8:
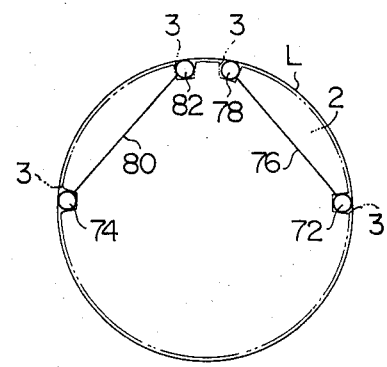
FIG. 8 is a view showing the retaining members shown in FIG. 7 received in grooves in the collapsible tire building drum and the looped rubber member retained on the collapsible tire building drum which is fully radially expanded with respect to the center axis thereof.

The reversible motor 28 is first driven to rotate about the center axis thereof in one direction to cause the threaded drive shaft 24 to move on and along the parallel guide rails 20 in the direction through the endless chain 36. As a consequence, the slide block 22 threadably mounted on the threaded drive shaft 24 advances on and along the parallel guide rails 20 toward the looped member forming machine 1. When the horizontal extending rods 72, 74, 78 and 82 are inserted by movement of the slide block 22 into the looped rubber member L depending from the holding plate 1a of the looped member forming machine 1 as shown in FIG. 4, the reversible motor 28 is brought into a stop and accordingly the slide block 22 also stops. At this point, the horizontal extending rods 72, 74, 78 and 82 are caused to be held in advance in position as shown in FIG. 4. The first and second horizontal air cylinders 64 and 66 are then actuated to cause the piston rods 68 and 70 to project simultaneously from the cylinders 64 and 66, respectively. As the piston rods 68 and 79 move transversely outwardly away from each other with respect to path of the slide block 22, the first and second rotary actuators 60 and 62 move symmetrically on the first and second guide rods 56 and 58, respectively, away from each other. Thus, the first and second horizontal extending rods 72 and 74 respectively mounted on the first and second rotary actuators 60 and 62 are caused to move transversely outwardly away from each other to contact with the looped rubber member L as indicated by phantom lines in FIG. 4. The vertical air cylinder 42 mounted on the slide block 22 is then actuated to cause the piston rod 44 thereof to project vertically upwardly therefrom. As the piston rod 44 projects vertically upwardly, the horizontal extending rods 72, 74, 78 and 82 move together with the horizontal support member 50 vertically upwardly as indicated by phantom lines in FIG. 4. As a consequence, the first and second horizontal extending rods 72 and 74 take up the looped rubber member L from the holding plate 1a of the looped member forming machine 1 as shown in FIG. 5. The reversible motor 28 is then rotated for a second time about its axis in the opposite direction to cause the slide block 22 to move on and along the parallel guide rails 20 away from the looped member forming machine 1. As a consequence, the looped rubber member L is withdrawn from the holding plate 1a of the looped member forming machine 1. While the slide block 22 is moving from the looped member forming machine 1 toward the collapsible tire building drum 2, the rotary actuator 52 is actuated to cause the horizontal support member 50 to rotate through 180 degrees from the initial position thereof. When the horizontal support member 50 is rotated through 180 degrees, the projection 51 on the horizontal support member 50 is brought into abutment with the stop 54 on the carrier plate 48. As a consequence, the horizontal extending rods 72, 74, 78 and 82 with the looped rubber member retained thereon are faced toward the collapsible tire building drum 2. The first rotary actuator 60 is then actuated to cause the output shaft 61 thereof to rotate in one direction. At the same time, the second rotary actuator 62 is actuated to cause the output shaft 63 thereof to rotate in the other direction. The first horizontal extending rod 72 is caused to rotate about its axis in response to rotation of the output shaft 61 of the first rotary actuator 60 so that the third horizontal extending rods 78 connected through the connecting rod 76 with the first horizontal extending rod 72 is moved angularly upwardly with respect to the first horizontal extending rod 72 in the direction as indicated by phantom lines in FIG. 6. At the same time, the second horizontal extending rod 74 is caused to rotate about its axis in response to rotation of the output shaft 63 of the second rotary actuator 62 so that the fourth horizontal extending rods 82 connected through the connecting rod 80 with the second horizontal extending rod 74 is moved angularly upwardly with respect to the second horizontal extending rod 74 in the direction as indicated by phantom lines in FIG. 6. The air cylinders 64 and 66 oppositely mounted on the horizontal support member 50 are then actuated to cause the respective piston rods 68 and 70 to retract therein so that the first and second rotary actuators 60 and 62 respectively connected with the piston rods 68 and 70 move on and along guide rods 56 and 58, respectively, toward each other. As a consequence, the first and second horizontal extending rods 72 and 74 respectively connected with the first and second rotary actuator 60 and 62 are caused to move toward each other in the directions indicated by the phantom lines in FIG. 6. Thus, the horizontal extending rods 72, 74, 78 and 82 move to form the looped rubber member L into a substantially circular configuration larger in diameter than the periphery of the collapsible tire building drum 2 radially contracted as shown in FIG. 7. Each position of the horizontal extending rods 72, 74, 78 and 82 corresponds to the grooves 3 formed on the periphery of the collapsible tire building drum 2 when the collapsible tire building drum 2 is in radially fully expanded state as shown in FIG. 8. If the center of the looped rubber member L in the form of a substantially circular configuration is not axially aligned with the longitudinal center axis of the collapsible tire building drum 2, the horizontal extending rods 72, 74, 78 and 82 can be dispositioned, by moving vertically upwardly or downwardly the piston rod 44 of the vertical air cylinder 42, such that the center of the member L is brought into axial alignment with the longitudinal axis of the collapsible tire building drum 2. When the looped rubber member L is moved, in response to movement of the slide block 22, into the position in which the looped member L surrounds the periphery of the collapsible tire building drum 2 radially contracted as shown in FIG. 7, the reversible motor 28 is brought into a stop and accordingly the slide block 22 stops. The collapsible tire building drum 2 is then radially expanded with respect to the longitudinal axis thereof. When fully expanded, the collapsible tire building drum 2 receives the horizontal extending rods 72, 74, 78 and 82 in the grooves 3 in the periphery thereof and retains the looped rubber member L on the periphery thereof. The reversible motor 28 is then for a second time driven in the opposite direction so that the slide block 22 moves away from the collapsible tire building drum 2 toward the looped member forming machine 1. Thus, the horizontal extending rods 72, 74, 78 and 82 are withdrawn from the grooves 3 in the periphery of the collapsible tire building drum 2. While the slide block 22 is moving toward the looped member forming machine 1, the rotary actuator 52 is actuated to cause the horizontal support member 50 to rotate through 180 degrees. As a consequence, the horizontal extending rods 72, 74, 78 and 82 are faced toward the looped member forming machine 1. A new looped rubber member depending from the holding plate 1a of the looped member forming machine 1 is to be automatically applied onto the collapsible tire building drum 2 by repetition of the operation as described hereinbefore.

What is claimed is:

1. A method of applying a looped rubber member from a looped member forming machine onto a collapsible tire building drum having grooves formed in the periphery thereof, comprising the steps of
    inserting at least two pairs of retaining members in a first direction into said looped rubber member depending from the looped member forming machine;
    retaining said looped rubber member on said retaining members from the looped member forming machine;
    rotating said retaining members with said looped rubber member retained thereon toward the collapsible tire building drum to a second direction which is opposite to said first direction;
    forming said looped rubber member on said retaining members into a substantially circular configuration;
    transferring said substantially circular looped rubber member toward the collapsible tire building drum into a first position in which the center of the looped rubber member is in axial alignment with the longitudinal center axis of the collapsible tire building drum;
    further transferring said substantially circular looped rubber member from said first position into a second position in which said looped rubber member surrounds the periphery of the collapsible tire building drum radially contracted;
    receiving said retaining members in the grooves in the periphery of the collapsible tire building drum;
    applying said substantially circular looped rubber member onto the periphery of the collapsible tire building drum; and
    withdrawing said retaining members from the grooves in the periphery of the collapsible tire building drum.

2. A method as set forth in claim 1, in which said looped rubber member is retained on said retaining members by moving one pair of the retaining members of said two pairs transversely away from each other with respect to said first direction and further moving said one pair of the retaining members vertically with respect to said first direction.

3. A method as set forth in claim 1, in which said looped rubber member is formed into a substantially circular configuration by moving one pair of the retaining members of said two pairs transversely toward each other with respect to said second direction and moving angularly the other pair of the retaining members with respect to said one pair of the retaining members.

4. A method as set forth in claim 1, in which said looped rubber member is retained on said retaining members by moving one pair of the retaining members of said two pairs transversely away from each other with respect to said first direction and further moving said one pair of the retaining members vertically with respect to said first direction and in which said looped rubber member is formed into a substantially circular configuration by moving one pair of the retaining members of said two pairs transversely toward each other with respect to said second direction and moving angularly the other pair of the retaining members with respect to said one pair of the retaining members.

5. A method as set forth in claim 1, in which said retaining members are received in said grooves in the periphery of the collapsible tire building drum by expanding radially the collapsible tire building drum and in which said substantially circular looped rubber member is applied onto the periphery of the collapsible tire building drum by fully expanding radially the collapsible tire building drum.

6. A method as set forth in claim 4, in which said retaining members are received in said grooves in the periphery of the collapsible tire building drum by expanding radially the collapsible tire building drum and in which said substantially circular looped rubber member is applied onto the periphery of the collapsible tire building drum by fully expanding radially the collapsible tire building drum.

7. An apparatus for applying a looped rubber member from a looped member forming machine onto a collapsible tire building drum having grooves formed in the periphery thereof, comprising at least two pairs of retaining members for retaining the looped rubber member thereon from the looped member forming machine;

retaining member driving means having said retaining members mounted thereon and adapted for driving one pair of the retaining members of said two pairs to move toward and away from each other and the other pair of the retaining members to move angularly with respect to said one pair of the retaining members;

support member for supporting said retaining member driving means thereon;

support member rotating means mounted on said support member and adapted for rotating said support member about the center of the support member;

carrier plate having said support member rotatably mounted thereon;

carrier plate driving means having said carrier plate mounted thereon and adapted for driving said carrier plate to move vertically toward and away from the collapsible tire building drum;

slide block having said carrier plate driving means mounted thereon; and slide block driving means having said slide block threadably mounted thereon and adapted for driving said slide block to move horizontally toward and away from the tire building machine.

8. An apparatus as set forth in claim 7, in which said retaining members are constituted by a first pair of first and third longitudinal extending rods and a second pair of second and fourth longitudinal extending rods each of which extends parallel to one another, the first longitudinal extending rod being connected at one end thereof with said third longitudinal extending rod through a first connecting rod and the second longitudinal extending rod being connected at one end thereof with said fourth longitudinal extending rod through a second connecting rod.

9. An apparatus as set forth in claim 8, in which said retaining member driving means is constituted by a first rotary actuator having said first longitudinal extending rod mounted on the output shaft thereof, a second rotary actuator having said second longitudinal extending rod mounted on the output shaft thereof, a first air cylinder connected to said first rotary actuator and a second air cylinder connected to said second rotary actuator.

10. An apparatus as set forth in claim 9, in which said first and second rotary actuators are rotatably mounted on guide rods, respectively, on the said support member so as to move toward and away from each other.

11. An apparatus as set forth in claim 7, in which slide block driving means is constituted by a horizontal extending threaded drive shaft having said slide block threadably mounted on the threaded portions thereof, parallel guide rails having said slide block slidably mounted thereon, a driven sprocket gear carried on one end of said threaded drive shaft and a reversible motor connected through the output shaft thereof to a gear reducer, the gear reducer having an output shaft carrying a drive sprocket gear which is drivably connected through an endless chain to said driven sprocket gear.

12. An apparatus as set forth in claim 7, in which said carrier member driving means is constituted by a pair of vertical guide posts upstanding from said slide block and a vertical air cylinder upstanding from said slide block, each of the guide posts having a vertical guide rod slidably received therein, said carrier plate being mounted on the leading ends of said guide rods and the piston rod.

13. An apparatus as set forth in claim 7, in which said support member has mounted thereon a projection which is brought into abutment with stops on said carrier plate when the support member is rotated through 180 degrees with respect to the center thereof.

* * * * *